US009577343B2

(12) United States Patent
Park et al.

(10) Patent No.: US 9,577,343 B2
(45) Date of Patent: Feb. 21, 2017

(54) RANDOM PERTURBATION-BASED BEAMFORMING METHOD AND APPARATUS FOR USE IN MOBILE COMMUNICATION SYSTEM

(71) Applicants: Samsung Electronics Co., Ltd, Gyeonggi-do (KR); KOREA ADVANCED INSTITUTE OF SCIENCE AND TECHNOLOGY, Daejeon (KR)

(72) Inventors: Jeongho Park, Seoul (KR); Jiyun Seol, Gyeonggi-do (KR); Yonghoon Lee, Daejeon (KR); Minhyun Kim, Daejeon (KR); Sungjin Kim, Daejeon (KR); Uitae Hwang, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 455 days.

(21) Appl. No.: 14/142,618

(22) Filed: Dec. 27, 2013

(65) Prior Publication Data

US 2014/0184446 A1 Jul. 3, 2014

(30) Foreign Application Priority Data

Dec. 28, 2012 (KR) ........................ 10-2012-0155843

(51) Int. Cl.

*H04B 10/524* (2013.01)
*H01Q 15/14* (2006.01)

(Continued)

(52) U.S. Cl.

CPC ............... *H01Q 15/14* (2013.01); *H01Q 5/42* (2015.01); *H01Q 25/00* (2013.01)

(58) Field of Classification Search

CPC ........ H04B 7/0857; G01S 3/74; H01Q 14/14; H01Q 5/42

(Continued)

(56) References Cited

U.S. PATENT DOCUMENTS 5,909,460 A * 6/1999 Dent ........................ H01Q 3/26 342/383
2003/0139139 A1 * 7/2003 Onggosanusi ....... H04B 7/0632 455/63.1

(Continued)

*Primary Examiner* — Marcus Windrich

(57) ABSTRACT

A method and apparatus configures a beamforming coefficient based on the signal strength information without collecting channel information by adjusting the phase of the antennas through random perturbation. An antenna control method of a base station in a wireless communication system using a beamforming technique includes measuring $n^{th}$ received signal strength at $n^{th}$ phase of at least one receive antenna, measuring $(n+1)^{th}$ received signal strength at $(n+1)^{th}$ phase shifted randomly from the $n^{th}$ phase in one of forward and backward directions, and configuring a beamforming coefficient with the phase at which the received signal strength is greatest through comparison of received signal strengths. The random perturbation-based beamforming method and apparatus of the present disclosure is capable of configuring the beamforming coefficient appropriate for the normal cellular environment using a plurality analog array antenna without channel estimation overhead.

20 Claims, 9 Drawing Sheets

(51) Int. Cl.
*H01Q 25/00* (2006.01)
*H01Q 5/42* (2015.01)

(58) Field of Classification Search
USPC .......................................... 342/360, 367, 373
See application file for complete search history.

(56) References Cited

U.S. PATENT DOCUMENTS

| | | | | |
|---|---|---|---|---|
| 2009/0141824 A1* | 6/2009 | Xia | H04B 7/0417 | 375/267 |
| 2010/0026560 A1* | 2/2010 | Xia | G01S 3/74 | 342/173 |
| 2011/0032149 A1* | 2/2011 | Leabman | H01Q 1/246 | 342/368 |

* cited by examiner

RANDOM PERTURBATION-BASED BEAMFORMING METHOD AND APPARATUS FOR USE IN MOBILE COMMUNICATION SYSTEM

CROSS-REFERENCE TO RELATED APPLICATIONS AND CLAIM OF PRIORITY

The present application is related to and claims the benefit under 35 U.S.C. §119(a) of a Korean patent application filed on Dec. 28, 2012 in the Korean Intellectual Property Office and assigned Serial No. 10-2012-0155843, the entire disclosure of which is hereby incorporated by reference.

TECHNICAL FIELD

The present disclosure relates to a method and apparatus for configuring analog beamforming coefficient for use in a wireless communication system. In particular, the present disclosure relates to a method and apparatus for configuring beamforming coefficient based on the signal strength information without collecting channel information by adjusting the phase of the antennas through random perturbation.

BACKGROUND

Mobile communication systems developed to provide the users with voice communication services on the move. With the rapid advance of technologies, the mobile communication systems have evolved to support high speed data communication services as well as the standard voice communication services. As a consequence, the wireless data traffic has increased considerably, resulting in needs of higher data rate.

Typically, the data rate can be increased by increasing the frequency bandwidth or improving frequency utilization efficiency. In the latter case, the current generation communication technologies have almost reached to the theoretical limit of the frequency utilization efficiency, it is difficult to further increase the frequency utilization efficiency through technical improvement. Accordingly, the technology of using wide frequency bandwidth receives attention.

Since it is very difficult to secure broad frequency bandwidth in the frequency band (<5 Ghz) on which the current cellular mobile communication system, there is a need of securing the broad frequency bandwidth in the higher frequency band. Since the frequency band available for broadband communication in the bandwidth over 1 Ghz is limited under the current frequency distribution policy, it is proposed to use the millimeter wave band over 30 Ghz for wireless communication.

However, such a high-frequency band communication has a drawback in that the signal attenuation increases significantly as the propagation distance increases. In detail, as the frequency increases, the propagation pathloss increases and the propagation distance decreases, resulting in reduction of the service coverage. One of the key technologies to mitigate the propagation pathloss and increase the propagation distance is beamforming.

SUMMARY

To address the above-discussed deficiencies, it is a primary object to provide a method and apparatus for configuring the beamforming coefficient based on only the signal strength with collecting channel information by adjusting the phase of the antenna through random perturbation.

In accordance with certain embodiments of the present disclosure, an antenna control method of a base station in a wireless communication system using a beamforming technique is provided. The antenna control method includes measuring $n^{th}$ received signal strength at $n^{th}$ phase of at least one receive antenna, measuring $(n+1)^{th}$ received signal strength at $(n+1)^{th}$ phase shifted randomly from the $n^{th}$ phase in one of forward and backward directions, and configuring a beamforming coefficient with the phase at which the received signal strength is greatest through comparison of received signal strengths.

In accordance with certain embodiments of the present disclosure, an antenna control method of a terminal in a wireless communication system using a beamforming technique is provided. The antenna control method includes measuring $n^{th}$ received signal strength at $n^{th}$ phase of at least one receive antenna, measuring $(n+1)^{th}$ received signal strength at $(n+1)^{th}$ phase shifted randomly from the $n^{th}$ phase in one of forward and backward directions, and configuring a beamforming coefficient with the phase at which the received signal strength is greatest through comparison of received signal strengths.

In accordance with certain embodiments of the present disclosure, a base station controlling antennas in a wireless communication system using a beamforming technique is provided. The base station includes a transceiver which transmits and receives signals to and from a terminal and a controller which measures $n^{th}$ received signal strength at $n^{th}$ phase of at least one receive antenna, measures $(n+1)^{th}$ received signal strength at $(n+1)^{th}$ phase shifted randomly from the $n^{th}$ phase in one of forward and backward directions, and configures a beamforming coefficient with the phase at which the received signal strength is greatest through comparison of received signal strengths.

In accordance with certain embodiments of the present disclosure, a terminal controlling antennas in a wireless communication system using a beamforming technique is provided. The terminal includes a transceiver which transmits and receives signals to and from a base station and a controller which measures $n^{th}$ received signal strength at $n^{th}$ phase of at least one receive antenna, measures $(n+1)^{th}$ received signal strength at $(n+1)^{th}$ phase shifted randomly from the $n^{th}$ phase in one of forward and backward directions, and configures a beamforming coefficient with the phase at which the received signal strength is greatest through comparison of received signal strengths.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure are described with reference to the accompanying drawings in detail. Detailed description of well-known functions and structures incorporated herein may be omitted to avoid obscuring the subject matter of the present disclosure.

Beamforming is a technology to focus the signals transmitted by a plurality of antennas on a certain direction. An antenna system formed with a plurality of antennas is called array antenna, and the antennas constituting the array antenna are called element antennas or antenna elements.

With the use of beamforming technique, it is possible to increase the signal propagation distance and reduce interference to other users significantly due to the directionality of the signal.

It is also possible to use reception beamforming at the recipient side using a reception array antenna to focus the reception on a certain direction, thereby increasing the signal reception sensitivity and avoiding interference signals in other directions than the intended.

Figure 1:
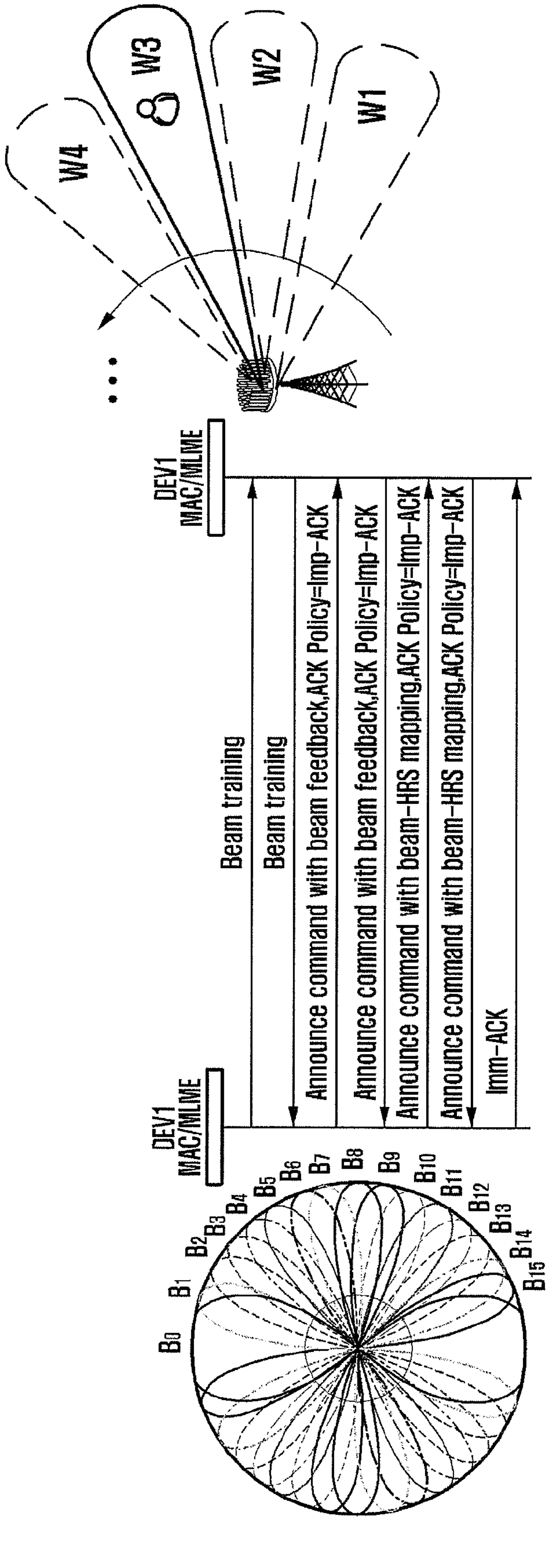
FIG. 1 illustrates a diagram for explaining a fixed beam-based beam sweeping according to the present disclosure.

Such a beamforming technique is advantageous for use in the high frequency band communication system. Since the wavelength is shortened as the frequency increases, it is possible to implement an array antenna with large amount of antennas within the same area by arranging the antennas at half wavelength interval. This means that the communication system operating on the high frequency band can achieve relatively high beamforming gain (antenna gain) as compared to the communication system operating on the low frequency band. FIG. 1 illustrates a diagram for explaining a fixed beam-based beam sweeping according to the present disclosure.

In the Institute of Electrical and Electronics Engineers (IEEE) 802.15.3c (WiGig), it is proposed to change the beam coefficient until the beam having the maximum signal value based on the fixed beam pattern in a Personal Area Network (PAN) environment. That is, a beam link having the maximum signal value between the base station and the UE is selected among the combinations of M transmit beamformings and N receive beamformings (i.e., M×N beamforming combinations).

However, this technique has a drawback in that the beam link acquisition time increases as the number of fixed beam patterns increases. Also, since this is designed for use in establishing a communication link through beam sweep in the Wireless Personal Area Network (WPAN) or Wireless Local Area Network (WLAN) environment, it is difficult to apply to a cellular system.

Figure 2:
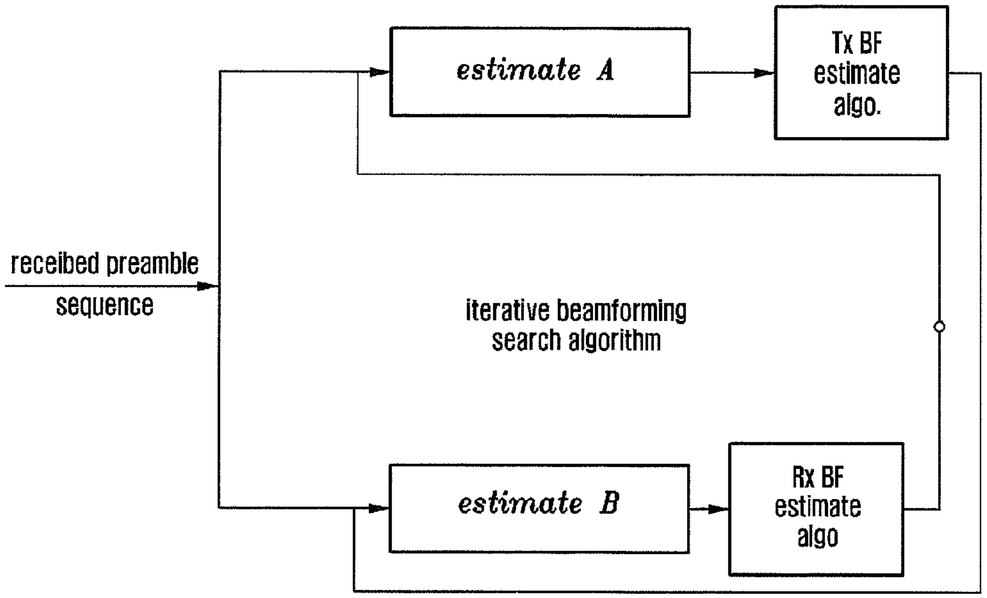
FIG. 2 illustrates a technique for determining a beam coefficient based on the collected channel information according to the present disclosure.

FIG. 2 illustrates a technique for determining a beam coefficient based on the collected channel information according to the present disclosure.

The device depicted in FIG. 2 is designed to determine the beam coefficient through channel estimation based on preamble sequence. That is, the device of FIG. 2 determines the beam coefficient based on the channel information collected per subcarrier other than fixed beam pattern.

In this case, it is basically required to perform the channel estimation on all of the subcarriers, resulting in channel estimation overhead. Also, as the number of antennas increases, the channel estimation complexity increases.

The present disclosure proposes an efficient beamforming method based on a simplified system appropriate for the normal cellular environment using a plurality of analog array antennas without channel estimation overhead.

In order to achieve this, the embodiments of present disclosure measures the received signal strength and repeats antenna phase adjustment process through random perturbation to determine the optimized beamforming coefficient.

Figure 3:
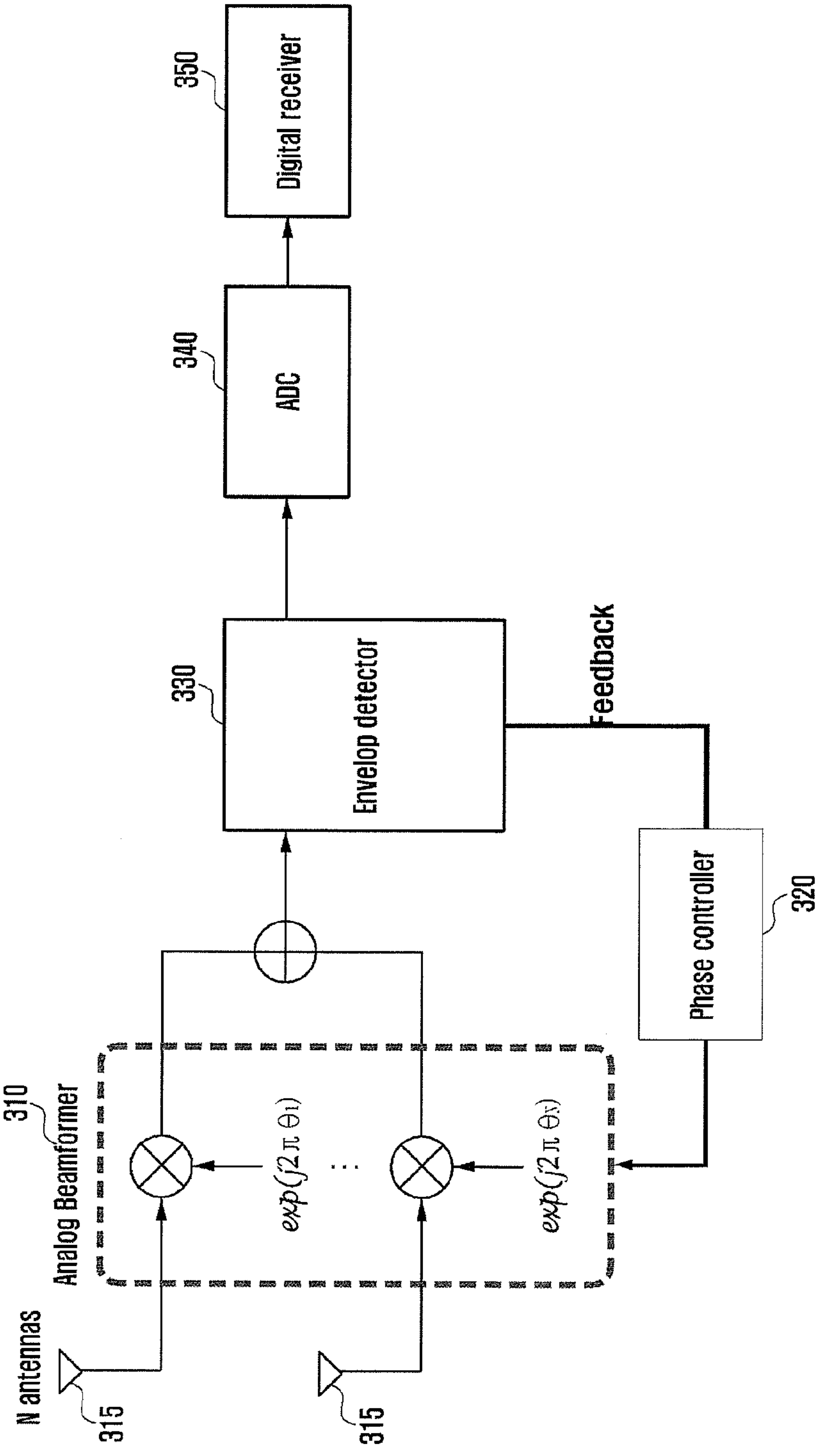
FIG. 3 illustrates a configuration of a beamforming coefficient determination apparatus according to embodiments of the present disclosure.

FIG. 3 illustrates a configuration of a beamforming coefficient determination apparatus according to embodiments of the present disclosure.

As shown in FIG. 3, the apparatus according to embodiments of the present disclosure includes an array antenna 310 including a plurality of antennas 315, a controller 320, a signal strength measurer 330, an Analog to Digital converter (ADC) 340, and a digital receiver 350.

The signal strength measurer 330 measures the strength of the received signal using the reference signal such as preamble signal, and the controller 320 shifts the phase of the antenna 310 repeatedly based on the received signal strength.

In more detail, the controller 320 repeats the process of adjusting the antenna phase through random perturbation based on the received signal strength measured by the signal strength measurer 330. The description of determining the beamforming coefficient is made later in detail with reference to accompanying drawings.

Figure 4:
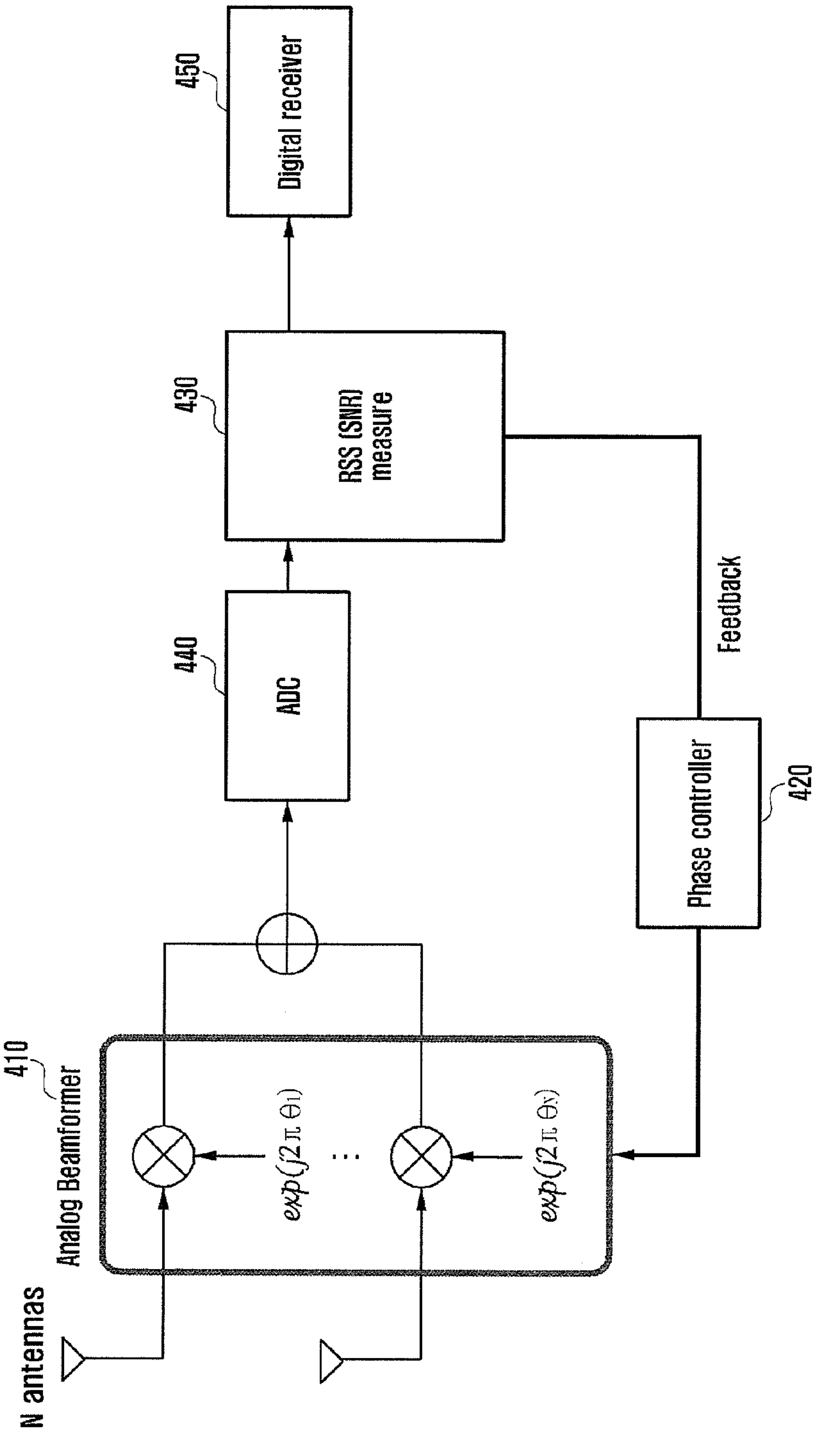
FIG. 4 illustrates a configuration of a beamforming coefficient determination apparatus according to embodiments of the present disclosure.

The apparatus of FIG. 3 may be modified as shown in FIG. 4.

FIG. 4 illustrates a configuration of a beamforming coefficient determination apparatus according to embodiments of the present disclosure.

Unlike the apparatus of FIG. 3, a signal strength measurer 430 is connected to the output node of the ADC 440 in the apparatus of FIG. 4. In this case, the controller 420 is capable of adjusting the antenna phase based on the signal strength without channel estimation even after the AD conversion.

Meanwhile, it is noted that the beamforming coefficient determination apparatuses depicted in FIGS. 3 and 4 support all beamforming coefficient determination methods according to the embodiments of the present disclosure. That is, the methods depicted in FIGS. 5 and 6 can be implemented in the apparatuses of FIGS. 3 and 4.

Figure 5:
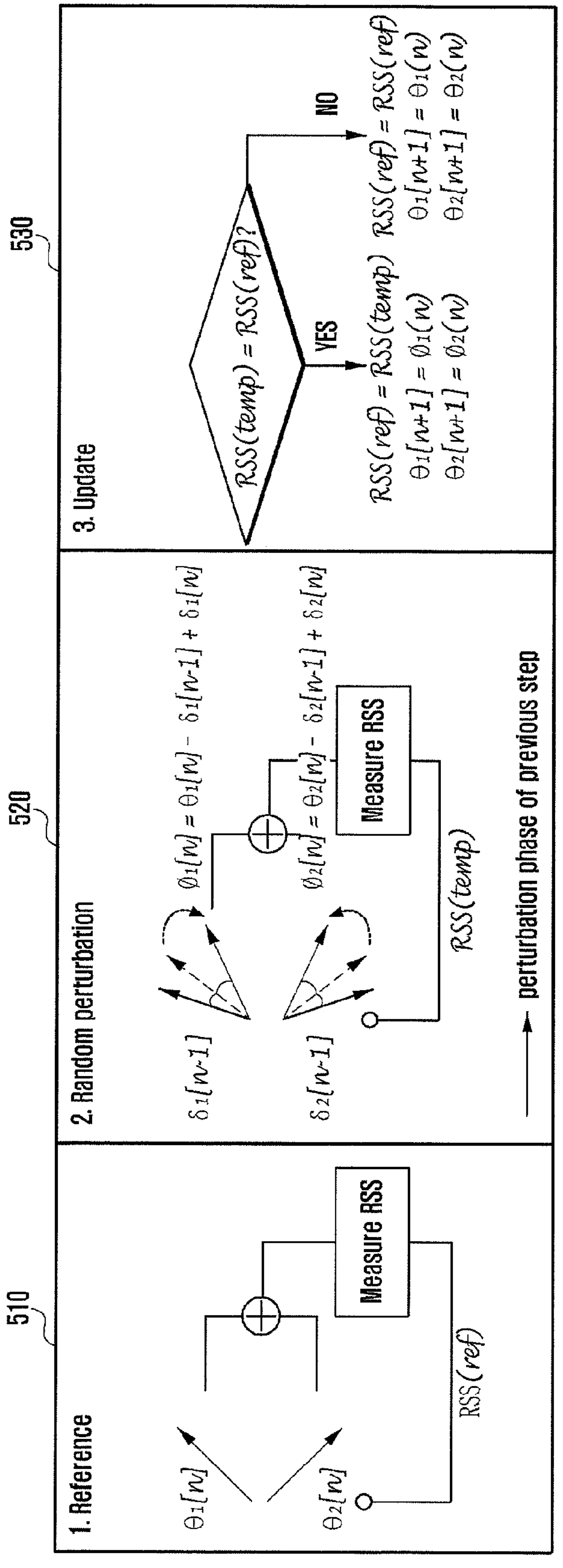
FIG. 5 illustrates a beamforming coefficient determination method according to embodiments of the present disclosure.

FIG. 5 illustrates a beamforming coefficient determination method according to embodiments of the present disclosure.

Block 510 of FIG. 5 shows an operation of configuring initial beamforming coefficient and measuring initial Received Signal Strength (RSS). The controller sets the initial phase of each antenna to the phase value of the transmitter or user direction (directional beam). Next, the controller measures the RRS in the case of applying the initial phase value to the antenna. The controller stores the initial phase and RRS as phase(ref) and RRS(ref), respectively.

Blocks 520 and 530 of FIG. 5 show the operations of changing the antenna phase through random perturbation and updating the beamforming coefficient.

After setting the initial values, the controller shifts the initial phase of the antennas as much as +θ or −θ randomly. Next, the controller measures the received signal strength in the case that the shifted phase value is applied to the antenna. The controller stores the shifted phase and RRS to which the shifted phase is applied as phase(temp) and RSS(temp), respectively.

Afterward, the controller compares RRS(ref) and RRS (temp). If RSS(temp) is greater than RSS(ref), i.e., RSS(ref) <RSS(temp), the controller substitutes phase(temp) and RSS (temp) for reference values. Otherwise, if RSS(ref)>RSS (temp), the controller maintains phase(ref) and RSS(ref) as the reference values.

Afterward, the controller repeats shifting the phase of the antenna randomly and measuring the received signal strength. Through this iterative process, the controller is capable of find the phase converging to the maximum value.

In the present disclosure, if the random perturbation is applied, this means that the optimized phase maximizing the received signal strength is determined by repeating the random phase shift of the antenna and received signal Table 1 shows a random perturbation-based algorithm.

TABLE 1

Initialization: $\theta_i[1] = 0$; $\mathrm{RSS(ref)} = \left|\sum_i^N e^{j\theta_i[1]} y^i(1) + \sum_i^N e^{j\theta_i[1]} n^i(1)\right|$;

Terms:
- $\theta_i[n]$: phase of i-th antenna at n-th iteration
- $\phi_i[n]$: phase correction term of i-th antenna at n-th iteration
- RSS(·): received signal strength
- $y^i(n)$: received signal of i-th antenna at n-th iteration
- $n^i(n)$: noise of i-th antenna at n-th iteration Iterate for all antennas:

1. Set $\delta_i[n] = \pm\delta_0$ ("+" or "−" with equal probability).
2. Use $\phi_i[n] = \theta_i[n] + \delta_i[n]$ to perform beamforming.
3. Estimate $\mathrm{RSS(temp)} = \left|\sum_i^N e^{j\theta_i[n]} y^i(n) + \sum_i^N e^{j\theta_i[n]} n^i(n)\right|$;
4. If RSS(temp) > RSS(ref)
   $\theta_i[n+1] = \phi_i[n] = \theta_i[n] + \delta_i[n]$;
   RSS(ref) = RSS(temp);
   else
   $\theta_i[n+1] = \theta_i[n]$;
   end TABLE 1-continued FIG. 6 illustrates a beamforming coefficient determination method according to embodiments of the present disclosure.

Figure 6:
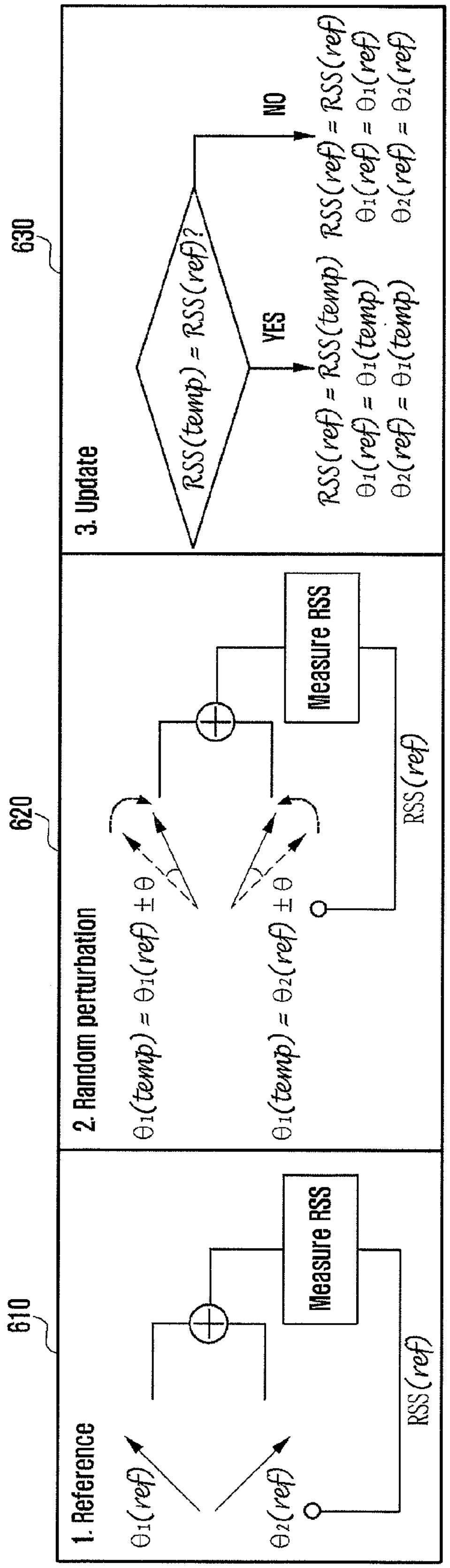
FIG. 6 illustrates a beamforming coefficient determination method according to embodiments of the present disclosure.

Block 610 of FIG. 6 shows an operation in which the controller stores the nth phase and RRS obtained by applying the phase as phase(ref) and RSS(ref), respectively, while shifting the phase of the antenna repeatedly by applying random perturbation.

Blocks 620 and 630 of FIG. 6 show operations of adjusting the shift value more efficiently when shifting the antenna phase by applying random perturbations.

As described above, the controller shifts the phase of the antenna randomly as much as +θ and −θ and, at this time, the controller determines the shift value of the antenna phase at the next stage based on the received signal strength of the previous stage (i.e., comparison result between RSS(ref) and RSS(temp)).

In detail, if the RSS(ref) has been greater than RSS(temp) at the previous stage (i.e., RSS(ref)>RSS(temp)), it is possible to compensate the antenna phase shift value at the next stage for the phase shifted to incorrect direction at the previous stage.

That is, according to embodiments of the present disclosure, in the case of shifting antenna phase by applying random perturbation, it is possible to determine the phase shift value for use at the next stage in consideration of the received signal strength value at the previous stage.

Table 2 shows the algorithm of FIG. 6.

TABLE 2

Initialization:

$\theta_i[1] = 0$; $\varepsilon_i[1] = 0$; $\mathrm{RSS(ref)} = \left|\sum_i^N e^{j\theta_i[1]} y^i(1) + \sum_i^N e^{j\theta_i[1]} n^i(1)\right|$;

Terms:
- $\theta_i[n]$: phase of i-th antenna at n-th iteration
- $\phi_i[n]$: phase correction term of i-th antenna at n-th iteration
- $\epsilon_i[n]$: history term of i-th antenna at n-th iteration
- RSS(·): received signal strength
- $y^i(n)$: received signal of i-th antenna at n-th iteration
- $n^i(n)$: noise of i-th antenna at n-th iteration Iterate for all antennas:

1. Set $\delta_i[n] = \pm\delta_0$ ("+" or "−" with equal probability).
2. Use $\phi_i[n] = \theta_i[n] + \epsilon_i[n] + \delta_i[n]$ to perform beamforming.
3. Estimate $\mathrm{RSS(temp)} = \left|\sum_i^N e^{j\phi_i[n]} y^i(n) + \sum_i^N e^{j\phi_i[n]} n^i(n)\right|$;
4. If RSS(temp) > RSS(ref)
   $\theta_i[n+1] = \phi_i[n] = \theta_i[n] + \epsilon_i[n] + \delta_i[n]$;
   $\epsilon_i[n+1] = 0$;
   RSS(ref) = RSS(temp);
   else
   $\theta_i[n+1] = \theta_i[n]$;
   $\epsilon_i[n+1] = -\delta_i[n]$;
   end As described above, the beamforming coefficient determination method of FIG. 5 or 6 can be implemented in all of the beamforming coefficient determination devices according to various embodiments of the present disclosure. That is, the device of FIG. 3 or 4 supports the both the methods described with reference to FIGS. 5 and 6.

FIGS. 7, 8, and 9A and 9B are diagrams for explaining the effect of the beamforming method according to embodiments of the present disclosure.

Figure 7:
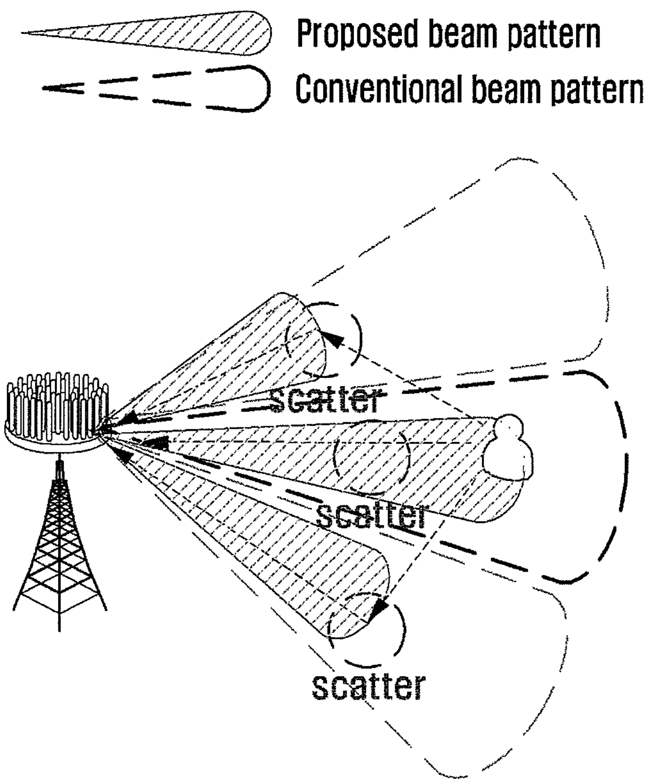
FIGS. 7, 8, and 9A and 9B illustrate the effect of the beamforming method according to embodiments of the present disclosure.

As shown in FIG. 7, the method of the present disclosure is applicable to the analog beamforming system in the channel environment with a plurality of scatters. Beam-Division Multiple Access (BDMA) and Wireless Gigabit Alliance (WiGig) are representative examples.

Figure 8:
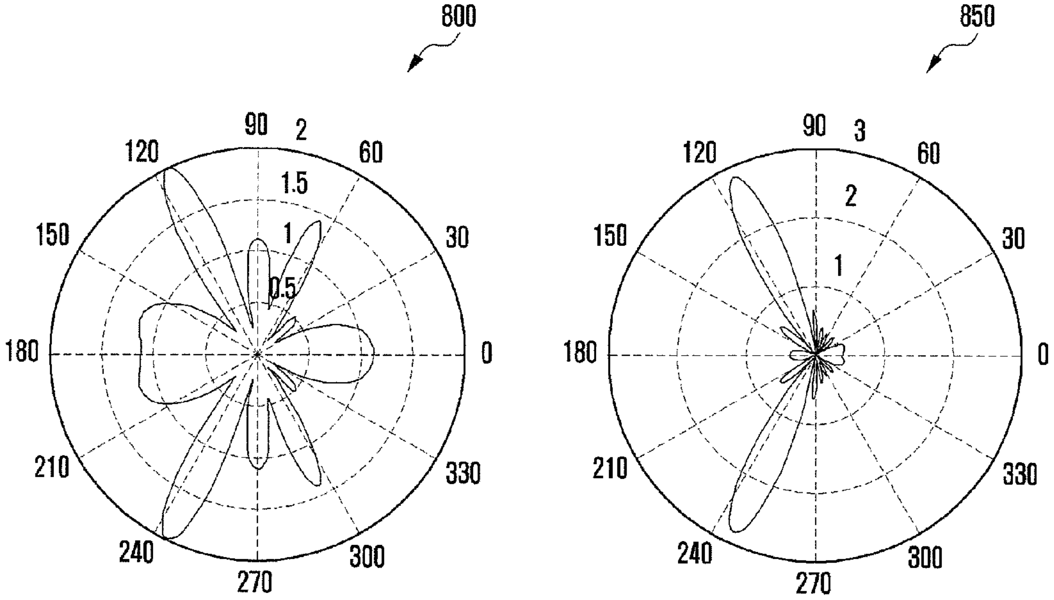

FIG. 8 is a diagram for explaining differences between beam patterns 800 of the proposed method and the beam patterns 850 of another method. FIG. 8 shows that the beam patterns 800 from the beamforming method of the present disclosure provides an omnidirectional beam pattern as compared to the beam patterns 850 from the single direction beam sweeping technique.

Figure 9A:
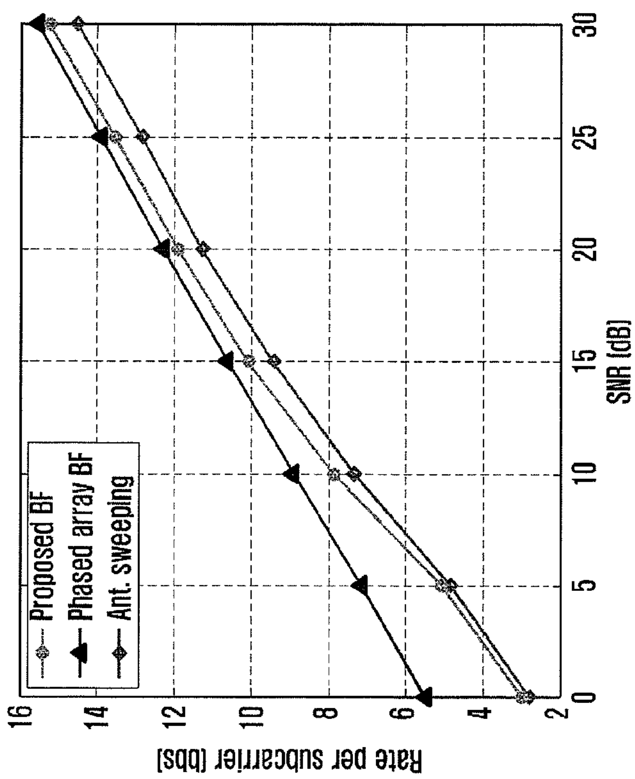
Figure 9B:
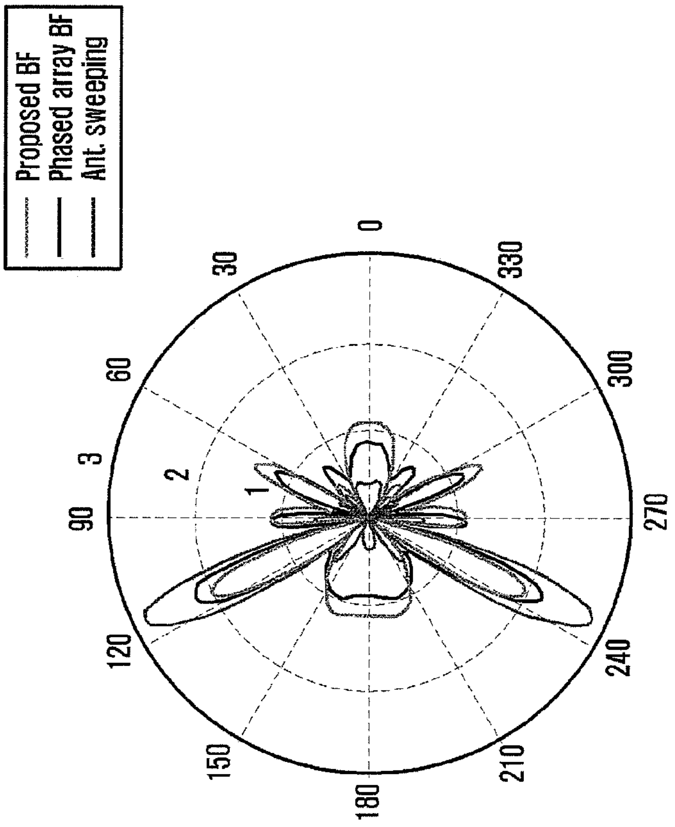

FIGS. 9A and 9B illustrate the simulation result of performances of the proposed beamforming method and the other method. The simulation result shows that the proposed beamforming method obtain the performance gain of 2-3 dB as compared to the other beamforming method over 10 dB of SNR. Compared to the case of forming the beam pattern in a single direction, forming the beam pattern for the signal received in omni-direction achieve the diversity (power) gain.

The simulation of FIGS. 9A and 9B has been conducted under the following assumptions.

IEEE 802.11 standard-based simulation (# of subcarriers=64/CP length=16)

Use preamble sequence (STF) signal duration

RF simulation in 8× oversampling domain

Antenna sweeping: set phase resolution to have the same burden as the beamforming method according to an embodiment of the present disclosure.

At this time, the result of the simulation conducted under the assumption of perturbation phase angle of 90 degree configured for the system having eight receive antennas is shown in FIG. 8. The simulation result of FIG. 8 is the case where the NLOS channel and 802.16e PedA channel model are applied.

The number of phase shifts has been set to 100 for the case of using the basic algorithm of table 1 and 50 for the case of using the modified algorithm of table 2. 64 time samples are collected with 8-tone signal for 1 envelope measurement time. That is, if the basic algorithm of table 1 is used, this means that total 800 tone signals (6400 time samples) are collected; and if the modified algorithm of table 2, this means that total 400 tone signals (3200 time samples) are collected.

The random perturbation-based beamforming method and apparatus of the present disclosure is capable of configuring the beamforming coefficient appropriate for the normal cellular environment using a plurality analog array antenna without channel estimation overhead.

Also, the random perturbation-based beamforming method and apparatus of the present disclosure is capable of determining the best beamforming coefficient by repeating antenna phase adjustment based on the random perturbation only with reception signal measurement.

Although the present disclosure has been described with embodiments, various changes and modifications may be suggested to one skilled in the art. It is intended that the present disclosure encompass such changes and modifications as fall within the scope of the appended claims.

What is claimed is:

1. An antenna control method of a base station in a wireless communication system using a beamforming technique, the method comprising:

iterating, wherein each iteration has an index n and includes:

measuring $n^{th}$ received signal strength at $n^{th}$ phase of at least one receive antenna, using a signal strength measurer, and measuring $(n+1)^{th}$ received signal strength at $(n+1)^{th}$ phase that is shifted randomly from the $n^{th}$ phase; and configuring, by a controller, a beamforming coefficient with the phase at which the received signal strength is greatest based on a comparison of the received signal strengths of the iterations.

2. The method of claim 1, wherein the iterating continues until the received signal strength increases no more, and wherein the iterating further comprises:

shifting the phase of the at least one receive antenna randomly in either a forward or backward direction;

measuring the received signal strength at every shifted phase; and comparing the $n^{th}$ received signal strength and the $(n+1)^{th}$ received signal strength.

3. The method of claim 2, wherein the shifting of the phase of the at least one receive antenna comprises:

determining $(n+2)^{th}$ phase by shifting the $(n+1)^{th}$ phase of the at least one receive antenna based on the comparison result between the $n^{th}$ received signal strength and the $(n+1)^{th}$ received signal strength.

4. The method of claim 3, wherein the shifting of the phase of the at least one receive antenna comprises determining, when the $n^{th}$ received signal strength is greater than the $(n+1)^{th}$ received signal strength, the $(n+2)^{th}$ phase after compensating the $(n+1)^{th}$ phase as much as the phase shifted from the $n^{th}$ phase.

5. The method of claim 1, wherein the at least one receive antenna comprises a plurality of receive antennas.

6. An antenna control method of a terminal in a wireless communication system using a beamforming technique, the method comprising:

iterating, wherein each iteration has an index n and includes:

measuring $n^{th}$ received signal strength at $n^{th}$ phase of at least one receive antenna, using a signal strength measurer;

measuring $(n+1)^{th}$ received signal strength at $(n+1)^{th}$ phase that is shifted randomly from the $n^{th}$ phase; and configuring, by a controller, a beamforming coefficient with the phase at which the received signal strength is greatest based on a comparison of the received signal strengths of the iterations.

7. The method of claim 6, wherein the iterating continues until the received signal strength increases no more, and wherein the iterating further comprises:

shifting the phase of the at least one receive antenna randomly in either a forward or backward direction;

measuring the received signal strength at every shifted phase; and comparing the $n^{th}$ received signal strength and the $(n+1)^{th}$ received signal strength.

8. The method of claim 7, wherein the shifting of the phase of the at least one receive antenna comprises determining $(n+2)^{th}$ phase by shifting the $(n+1)^{th}$ phase of the at least one receive antenna based on the comparison result between the $n^{th}$ received signal strength and the $(n+1)^{th}$ received signal strength.

9. The method of claim 8, wherein the shifting of the phase of the at least one receive antenna comprises determining, when the $n^{th}$ received signal strength is greater than the $(n+1)^{th}$ received signal strength, the $(n+2)^{th}$ phase after compensating the $(n+1)^{th}$ phase as much as the phase shifted from the $n^{th}$ phase.

10. The method of claim 6, wherein the at least one receive antenna comprises a plurality of receive antennas.

11. A base station controlling antennas in a wireless communication system using a beamforming technique, the base station comprising:

- a transceiver configured to transmit and receive signals to and from a terminal; and
- a controller configured to:
  - for each iteration having an index n:
    - control to measure $n^{th}$ received signal strength at $n^{th}$ phase of at least one receive antenna, and
    - control to measure $(n+1)^{th}$ received signal strength at $(n+1)^{th}$ phase that is shifted randomly from the $n^{th}$ phase, and
  - configure a beamforming coefficient with the phase at which the received signal strength is greatest based on a comparison of the received signal strengths of the iterations.

12. The base station of claim 11, wherein the controller is further configured to:

- shift the phase of the at least one receive antenna randomly in either a forward or backward direction;
- measure the received signal strength at every shifted phase; and
- compare the $n^{th}$ received signal strength and the $(n+1)^{th}$ received signal strength.

13. The base station of claim 12, wherein the controller is further configured to determine $(n+2)^{th}$ phase by shifting the $(n+1)^{th}$ phase of the at least one receive antenna based on the comparison result between the $n^{th}$ received signal strength and the $(n+1)^{th}$ received signal strength.

14. The base station of claim 13, wherein the controller is further configured to determine, when the $n^{th}$ received signal strength is greater than the $(n+1)^{th}$ received signal strength, the $(n+2)^{th}$ phase after compensating the $(n+1)^{th}$ phase as much as the phase shifted from the $n^{th}$ phase.

15. The base station of claim 11, wherein the at least one receive antenna comprises a plurality of receive antennas.

16. A terminal controlling antennas in a wireless communication system using a beamforming technique, the terminal comprising:

- a transceiver configured to transmit and receive signals to and from a base station; and
- a controller configured to:
  - for each iteration having an index n:
    - control to measure $n^{th}$ received signal strength at $n^{th}$ phase of at least one receive antenna,
    - control to measure $(n+1)^{th}$ received signal strength at $(n+1)^{th}$ phase that is shifted randomly from the $n^{th}$ phase, and
  - configure a beamforming coefficient with the phase at which the received signal strength is greatest based on a comparison of the received signal strengths of the iterations.

17. The terminal of claim 16, wherein the controller is further configured to:

- shift the phase of the at least one receive antenna randomly in either a forward or backward direction;
- measure the received signal strength at every shifted phase; and
- compare the $n^{th}$ received signal strength and the $(n+1)^{th}$ received signal strength.

18. The terminal of claim 17, wherein the controller is further configured to determine $(n+2)^{th}$ phase by shifting the $(n+1)^{th}$ phase of the at least one receive antenna based on the comparison result between the $n^{th}$ received signal strength and the $(n+1)^{th}$ received signal strength.

19. The terminal of claim 18, wherein the controller is further configured to determine, when the $n^{th}$ received signal strength is greater than the $(n+1)^{th}$ received signal strength, the $(n+2)^{th}$ phase after compensating the $(n+1)^{th}$ phase as much as the phase shifted from the $n^{th}$ phase.

20. The terminal of claim 16, wherein the at least one receive antenna comprises a plurality of receive antennas.

* * * * *